May 7, 1935.   G. B. EGGERT   2,000,512
LUBRICATING SYSTEM FOR DOUGH DIVIDERS
Filed Feb. 16, 1933   2 Sheets-Sheet 1
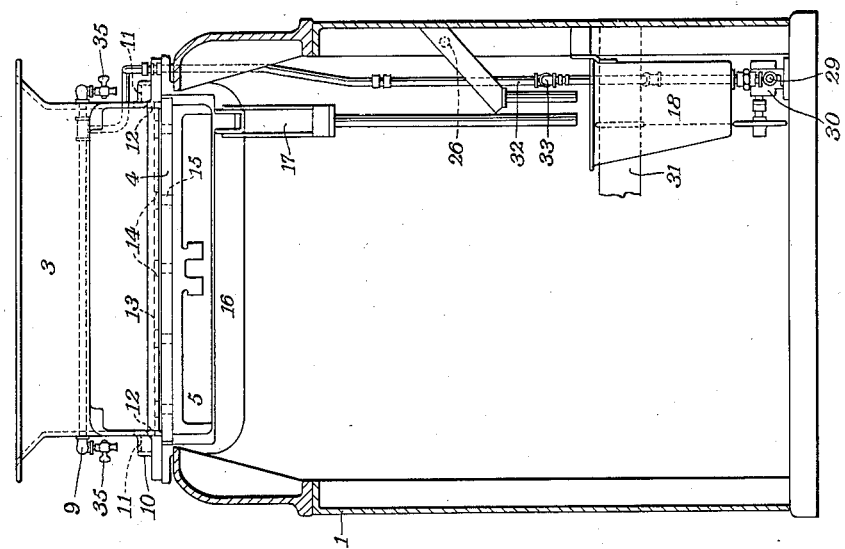
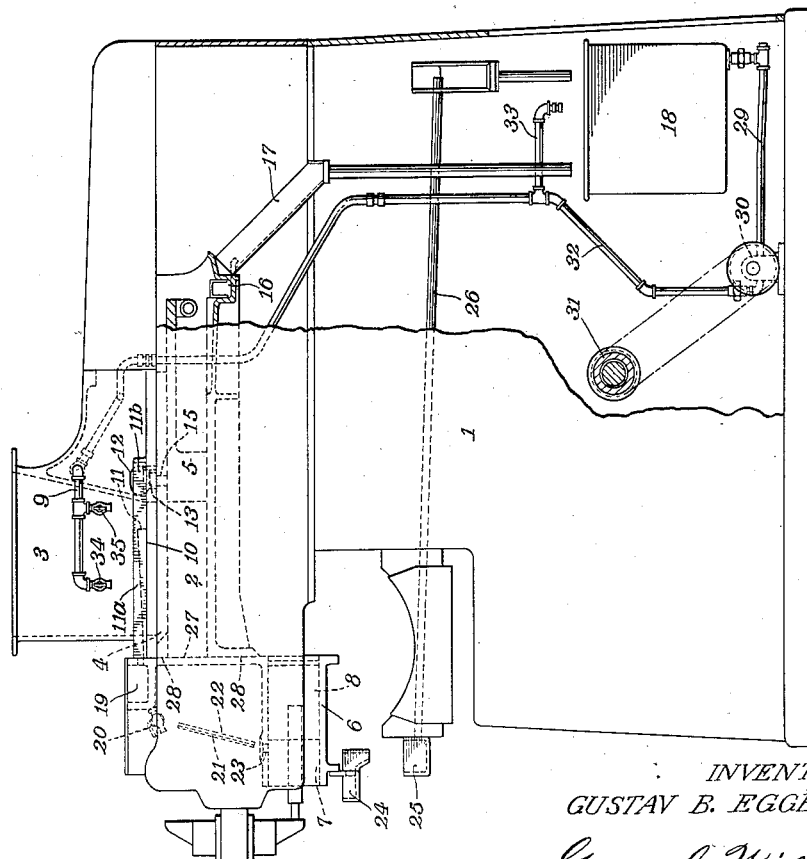
INVENTOR
GUSTAV B. EGGERT
BY George C. Willcox
ATTORNEY May 7, 1935.  G. B. EGGERT  2,000,512
LUBRICATING SYSTEM FOR DOUGH DIVIDERS
Filed Feb. 16, 1933  2 Sheets-Sheet 2
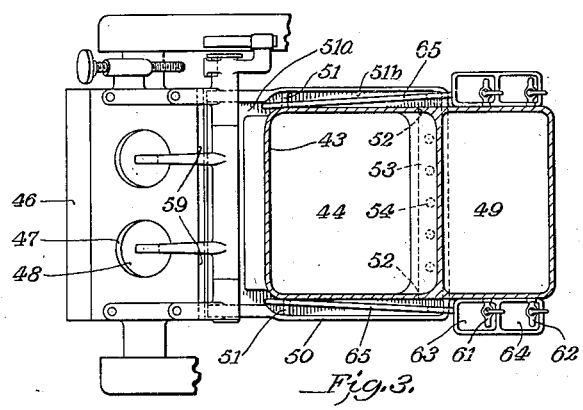
Fig. 3.
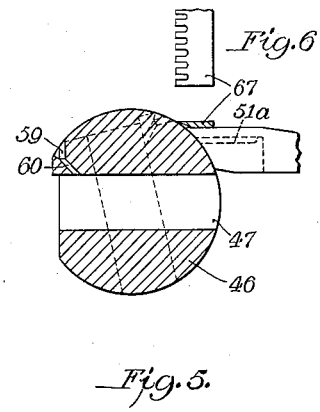
Fig. 6.
Fig. 5.
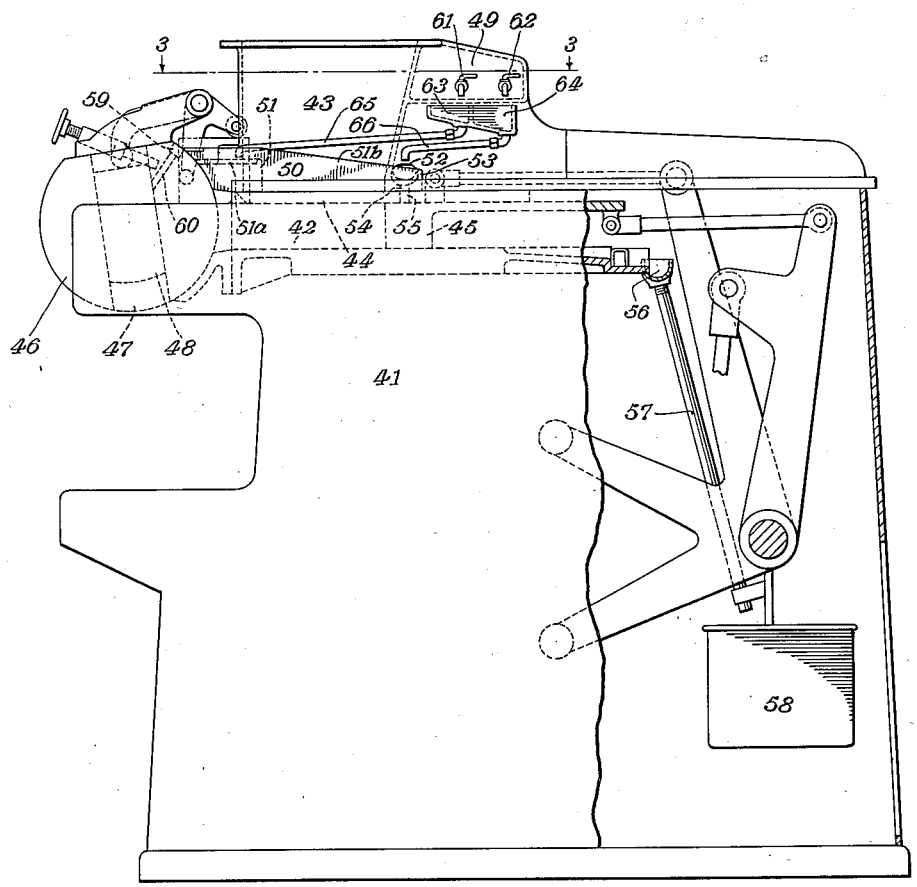
Fig. 4.
INVENTOR
GUSTAV B. EGGERT
BY George C. Willcox
ATTORNEY Patented May 7, 1935

2,000,512

UNITED STATES PATENT OFFICE 2,000,512

LUBRICATING SYSTEM FOR DOUGH DIVIDERS

Gustav B. Eggert, Saginaw, Mich., assignor to Baker Perkins Company, Inc., Saginaw, Mich., a corporation of New York Application February 16, 1933, Serial No. 657,040

4 Claims. (Cl. 107—15)

This invention relates to improvements in the lubricating system of dough dividers and has for its object to provide a simple, positive oiling system in which the supply of oil to various working parts is effected entirely by gravity flow and in which a return system for excess unused lubricating oil is provided to collect and carry it by gravity to a sump or reservoir.

The use of an excess of oil is rendered economical by my improved system. Such over-oiling has numerous advantages in the operation of a dough divider. It insures positive and ample lubrication of the working surfaces and prevents the formation of a thin film of dough between the working surfaces, which in the past has had a tendency to adhere and dry on the relatively moving parts, resulting in excessive consumption of power, or the eventual jamming of the machine.

In previous machines of this class, lubricated usually by a plurality of sight-feed oilers, the liability of the formation of objectionable dough film has required a very close fitting of the working surfaces.

My invention insures a copious and continuous supply of oil which prevents dough entering the spaces between the working parts and which prevents the adhesion of any dough which may enter such spaces. Thus it permits the use of much wider working clearances than have been permissible previously.

Such wider working clearances have definite practical advantages. For example, wide clearances between the compression ram and the chamber in which it operates and between the dividing pocket and the ejecting piston permits the ready escape of gases squeezed from the dough during its compression in the chamber and the measuring pocket. This is desirable in all dough dividers as it makes for more accurate scaling of the loaf. The presence of a constant film of oil to fill such spaces permits the leakage of gases but prevents the seepage of dough into the spaces filled with the oil.

The invention consists broadly, first in the provision of an oil reservoir at the top of the machine above the highest point to be lubricated. This reservoir is located above the compression chamber. Through an orifice or orifices leading from the reservoir through the top of the compression chamber oil flows by gravity onto the top of the usual cut-off knife, which reciprocates to separate intermittently the dough supply hopper from the compression chamber.

By suitable orifices through the cut-off knife oil flows by gravity onto the top of the compression plunger or ram. The excess oil fed to the knife and plunger flows from the rear of the compression chamber into a receiving trough or gutter, from which it is carried by gravity through suitable ducts to an oil sump in the base of the machine.

As a further feature of the invention, the same reservoir which supplies oil to the compression chamber and its associated mechanism also lubricates the dividing head of the machine in a simple but novel manner. This feature is equally applicable to dividing machines having vertically reciprocable or rotary dividing heads. The reservoir extends to the forward end of the machine and is closed off at the end by the surface of the dividing head which abuts against and reciprocates or rotates relatively to the face of the machine.

The dividing head, rotary or vertically reciprocable, has an oil reservoir which opens into the working face of the head and which is so located that during each operating cycle of the head it comes into position to receive oil from the main reservoir, either directly by gravity flow, or, as in certain rotary head machines, indirectly by receiving oil deposited in a film on the working face of the head, which oil is scraped or flows by gravity over the face into the reservoir.

From the dividing head reservoir oil flows through suitable conduits by gravity into each of the measuring pockets where it lubricates the measuring or ejector plunger.

In certain machines where an excess of oil is supplied to the measuring pocket and measuring plungers a trough may be provided to catch the drip of such excess oil from the measuring pocket, from which trough the oil is returned by gravity flow to the oil sump or reservoir.

As an added feature of my invention, an oil pump may be used to pump a constant flow of oil from the sump to the reservoir at the top of the machine. Thus an automatic supply and a constant recirculation of the oil is effected. The only attention required is a periodic replenishing of the oil at the one point, namely, the oil sump.

A further advantage of the machine is derived from the novel arrangement of the two registering reservoirs in the machine proper and in the dividing head. The oil flowing from the one to the other passes across the juncture between the working faces of the compression chamber and the dividing head. There is thus a constant flow of oil into this joint and the relative movement of the two working faces insures a positive and constant lubrication of the rubbing surfaces.

Referring to the drawings:

Fig. 1 is a side view of a divider having a vertically reciprocable dividing head, illustrating one application of my invention.

Fig. 2 is a rear elevation of the machine shown in Fig. 1.

Fig. 3 is a top plan view of a divider having a rotary head, and illustrates an alternative application of the invention.

Fig. 4 is a side elevation of the divider shown in Fig. 3.

Fig. 5 shows a modified means for supplying oil to the dividing head of Fig. 4.

Fig. 6 is a fragmentary detail view of an oil scraper shown in Fig. 5.

Fig. 1 shows a machine of a well-known type, comprising the frame or base 1, a compression chamber 2, a dough reservoir 3, a reciprocable cut-off knife 4, and a dough compressing ram 5 mounted for reciprocation in the chamber 2. The dividing head 6 is reciprocable vertically relative to the machine frame 1 and the compression chamber 2, moving in known manner from its upper dough-receiving position to its lower dough discharging position in which it is shown.

The dividing head 6 includes the usual plurality of measuring pockets 7, in each of which is a measuring or discharge plunger 8 actuated in known manner.

The operation of the machine is described in detail in my United States Patents No. 1,871,261, issued August 9, 1932, and No. 1,871,264, issued August 9, 1932.

The novel oiling system forming the subject matter of this application consists of an oil supply pipe 9 at the top of the machine. The oil supply pipe discharges into an oil reservoir 10 located at the top of the machine above the working parts to be lubricated. The reservoir 10 extends around the sides of the dough hopper 3 and across the front of the machine. Preferably the oil reservoir 10 is divided by a partition or sloping bottom member 11, into a forward section 11a, which supplies oil to the dividing head mechanism, and a rearward section 11b which feeds oil to the compression chamber 2 and its associated mechanism. Section 11b of reservoir 10 is provided with an oil outlet 12 in the side wall of the machine which leads to a trough or groove 13 in the top plate of the compression chamber 2. Oil holes 14 through the top plate of the compression chamber are provided to permit oil to flow from trough 13 onto the upper surface of the cut-off knife 4. Oil holes 15 through the cut-off knife 4 supply oil to the top surface of the ram 5. The oil flows around the ram 5 to lubricate all the walls of the compression chamber, and the surplus drains from the bottom of the compression chamber into a trough or gutter 16, from which a conduit 17 leads the oil into a sump 18.

The oil from section 11a of the reservoir 10 flows to the front of the machine, where the reservoir is closed off by the face of the dividing head. Here the reservoir is provided with a cutaway front wall, or an outlet aperture so that when the head 6 is in its lower position for discharging loaves from pockets 7 oil can flow from reservoir 10 into a reservoir 19 in the dividing head. Reservoir 19 is located in the upper part of the head 6, and an oil passage or cut away section of the front wall of the head is provided to admit oil to reservoir 19 from reservoir section 11a each time the two reservoirs come into register.

A plurality of metering valves 20, one for each measuring pocket, communicate with the bottom of reservoir 19 so that the amount of oil flowing from the reservoir can be controlled. A trough or conduit 21, preferably formed in a plate 22, leads from each valve 20 to an orifice 23 in the top of each measuring pocket 7. While the flow of oil to each pocket can be regulated by valve 20 to the minimum required, it is preferable that an excess supply of oil be provided for the measuring plungers 8, as well as for the compression ram. To permit this to be done without wasting oil a trough 24 extending beneath the back edge of the measuring pocket 7 is provided to catch the surplus oil draining from the pockets 7. Trough 24 drains into a lower trough 25, from which the oil flows through a conduit 26 to return to the sump 18.

The arrangement of reservoirs 11a and 19 permits a thorough lubrication of the rubbing surfaces 27 and 28, the faces of the dividing head and of the compressor respectively. The constant supply of oil in reservoir 11a against the moving face 27 of the head insures that the space between the surfaces will constantly be filled with oil and their relative movement spreads the oil to all parts of the rubbing surface.

A constant supply of oil in the supply pipe 9 and hence in reservoir 10, is provided by the following simple mechanism:

An oil draw-off pipe 29 leads from the bottom of sump 18 to a rotary pump 30. The pump 30 is driven in suitable manner from a rotating shaft 31 of the divider driving mechanism. The outlet of pump 30 is coupled to a pipe 32 leading to the oil supply 9. At a point above the sump 18 a by-pass pipe 33 tapped into pipe 32 serves to relieve excess pressure in pipe 32 by diverting a part of the oil into the sump 18. To permit regulation of the amount of oil fed to reservoir 10 the outlets from the supply pipe 9 are controlled by valves 34 and 35. Valve 34 is for the purpose of preventing the over-filling of sections 11a of the reservoir, while valve 35 is for the purpose of regulating the oil level in section 11b. These two valves, as shown, are required only if it is desired to maintain different levels of oil in the sections of the reservoir. Regulation of the oil supply sufficient for the successful operation of most dividers can be obtained by using only one outlet and valve from the oil supply pipe 9.

Figs. 3 and 4 show the invention applied to a divider having a rotary type dividing head. The dough compressing mechanism of this machine is identical in its construction and operation with that of the reciprocating-head machine just described. The oiling system is the same in its essentials, but differs in certain details of construction.

To save repetition of description, corresponding parts of the machine in Figs. 3 and 4 have been numbered similarly to those of the machine first described, the numbering series starting with numeral 41.

An oil reservoir 50 (corresponding to reservoir 10, Fig. 1) is divided by a partition 51 into sections 51a and 51b. Oil flows from section 51b through oil passages 52 in the side of the machine, oil channel 53 and holes 54 in the top plate of the compression chamber onto the top of the cut-off knife 44. Oil holes 55 through the cut-off knife feed oil onto the top of the ram 45 in the compression chamber 42. Excess oil flows from the compression chamber into a trough 56, thence through a conduit 57 into the oil sump 58.

The dividing head 46 is mounted for rotary reciprocation about its longitudinal axis, and its arcuate working face forms the front wall of reservoir section 51a to retain the oil therein.

The reciprocation of head 46 brings the measuring pockets 47 alternately into register with the compression chamber 42 and into their vertical discharging position. Fig. 4 shows the head approaching this position. The further rotation of the head into the discharging position causes the measuring plungers 48 to be pushed out flush with the arcuate working face of the head. In the head 46 a reservoir 59 is provided, located so that it is brought into register with the reservoir section 51a as shown, when the head moves to the discharging position. From reservoir 59 oil passages 60 lead to each measuring pocket 47.

The operation of the registering reservoirs 51a and 59 is identical with that of reservoirs 11a and 19 in the machine of Fig. 1.

The constant presence of oil at the top of the working faces of the head 46 and the machine proper lubricates the rubbing surfaces and provides a constant seal at the joint between the compression chamber 42 and the measuring pockets 47.

The oiling system shown in Figs. 3 and 4 differs from that of Figs. 1 and 2 in that it is not fully automatic. Instead, I have shown a large oil supply reservoir 49 at the top of the machine feeding oil through metering valves 61, 62 into sub-reservoirs or funnels 63, 64. Oil lines 65, 66 conduct the oil from the sub-reservoirs to the sections 51a, 51b respectively of reservoir 50. At long intervals the machine attendant may replenish the supply of oil in reservoir 49 from the oil which drains into the sump 58.

Fig. 5 shows the dividing head 46 of the machine illustrated in Figs. 3 and 4. It differs from that structure in the means provided to supply oil to the reservoir 59 and in the location of that reservoir. Reservoir 59 is closer to the measuring pocket 47 and to the left of or counter-clockwise from its position in Fig. 4. Therefore, it does not register or communicate directly with the reservoir 51a when the head is in its discharging position (indicated in dotted lines). Instead it receives a definitely regulated quantity of oil from the reservoir 51a in the following manner:

Each rotary reciprocation of the head 46 past the reservoir 51a spreads a film of oil over its working face. The thickness of this oil film is regulated by a scraper 67, as the head moves counter-clockwise, and as the head moves clockwise the scraper moves the oil over the cylindrical face of the head into the reservoir 59, or to a point from which it can flow by gravity into the reservoir.

My novel oiling system has several important advantages when applied to a machine of either type shown. The cost of a complex pressure-feed system with its necessity for oil-tight joints, is avoided and instead a system of the greatest mechanical simplicity is used. The oil flows to all working parts by gravity through a minimum of relatively large oil ducts or pipes which are unlikely to become plugged.

As compared with a plurality of individual metering oilers to be separately filled and adjusted, the attention required is reduced to a minimum. Only the level of the oil in reservoir 10 or 50 needs to be regulated, as by valves 61 and 62. The flow of oil to the working parts of the machine is automatically regulated according to the need for oil. For example, (see Fig. 1) the oil in reservoir 19 is automatically maintained at a constant level. If the oil is low in reservoir 19 it will draw off oil from reservoir 10 each time it comes into register therewith. If a small amount of oil is used to lubricate the measuring piston and the oil level is high in reservoir 19, no oil will flow into it when it comes into register with reservoir 10. Also, the oil required at the face of the dividing head will flow from reservoir 11a as required. If desired, an overflow pipe may be provided for reservoir 10 or 50, leading to the sump 18, eliminating the need for valves 34, 35 or 61, 62.

Having thus described my invention, what I claim and desire to secure by Letters Patent is:

1. In a dough divider having a compression chamber, dough compressing mechanism associated therewith, and a dividing head reciprocable relative to the outlet from said compression chamber, in combination, an oil reservoir mounted above said compression chamber, oil conduits connecting said reservoir and said compression chamber to lubricate by gravity flow the mechanism associated therewith, an oil reservoir in the upper part of said dividing head located so as to come into communication with said first mentioned reservoir once in each reciprocation of the head to receive oil from said first mentioned reservoir by gravity flow, conduits leading from said reservoir in the dividing head to the operating mechanism in said dividing head to carry oil thereto by gravity flow, an oil sump in the bottom of the dough divider, and conduits for intercepting the flow of unused oil from said dividing head and said compression chamber and leading such oil by gravity into said sump.

2. In a dough divider having a compression chamber and working mechanism associated therewith, a dividing head reciprocable relatively to said compression chamber and having operating mechanism, in combination, an oil reservoir above said compression chamber extending along the upper edge of the working face of the divider and having one wall formed by the working faces of said dividing head, an oil passage leading from said reservoir to supply oil by gravity to the mechanism of said compression chamber and a second oil reservoir in said dividing head arranged to supply oil by gravity to the operating mechanism of said head, said second reservoir positioned so as to be brought by the reciprocation of said head periodically into communication with said first-mentioned reservoir, whereby a constant supply of oil is maintained in said second reservoir and the relatively moving working faces of said head and divider are supplied with oil.

3. In a machine as claimed in claim 1, means for pumping oil from the sump in the base of the machine to the reservoir at the top of the machine across the compression chamber, whereby a constant supply of oil is maintained in said reservoir.

4. In a dough divider having a dividing head reciprocable relative to the frame of the machine, in combination, an oil reservoir extending along the upper edge of the working face of the machine and closed along said edge to retain oil by the working face of said dividing head, an oil reservoir in and opening onto the working face of said dividing head so located as to come into communication with said first-mentioned reservoir once in each reciprocation of the head to receive oil therefrom by gravity flow.

GUSTAV B. EGGERT.